United States Patent [19]

Asakura

[11] Patent Number: 5,371,566
[45] Date of Patent: Dec. 6, 1994

[54] CAMERA SYSTEM

[75] Inventor: Yasuo Asakura, Hachioji, Japan

[73] Assignee: Olympus Optical Co., Ltd., Tokyo, Japan

[21] Appl. No.: 27,057

[22] Filed: Mar. 5, 1993

[30] Foreign Application Priority Data

Mar. 5, 1992 [JP] Japan .................. 4-048599
Mar. 13, 1992 [JP] Japan .................. 4-055448

[51] Int. Cl.$^5$ .................. G03B 13/36; G03B 3/00
[52] U.S. Cl. .................. 354/400; 354/195.12
[58] Field of Search .................. 354/400, 402, 195.1, 354/195.12, 286

[56] References Cited

U.S. PATENT DOCUMENTS

| | | | |
|---|---|---|---|
| 4,426,147 | 1/1984 | Shiozawa et al. | 354/286 |
| 4,548,488 | 10/1985 | Honda et al. | 354/286 |
| 4,572,638 | 2/1986 | Nakai et al. | 354/286 |
| 4,733,258 | 3/1988 | Kojima | 354/286 |
| 4,912,494 | 3/1990 | Tanaka et al. | 354/286 |
| 4,974,004 | 11/1990 | Kawasaki et al. | 354/286 |
| 4,984,001 | 1/1991 | Himuto | 354/195.12 |
| 5,053,798 | 10/1991 | Ohara et al. | 354/286 |

Primary Examiner—Russell E. Adams
Attorney, Agent, or Firm—Louis Weinstein

[57] ABSTRACT

A camera system incorporating a camera and a conversion lens detachable with respect to the camera and acting to change the focal point distance of a photographing lens, the camera system including: an electric drive device for driving the photographing lens; a setting device for operating the electric drive device to set a focus range to a desired value; a mounting signal generating device for automatically or manually transmitting a signal denoting that the conversion lens has been mounted on the photographing lens; and a control device for operating the electric drive device in accordance with an output from the setting device and for forcibly operating the electric drive device until the focus range is made to be a proper distance if the set focus range is not a proper distance for performing a photographing operation by using the conversion lens when the control device receives an output from the mounting signal generating device.

43 Claims, 13 Drawing Sheets

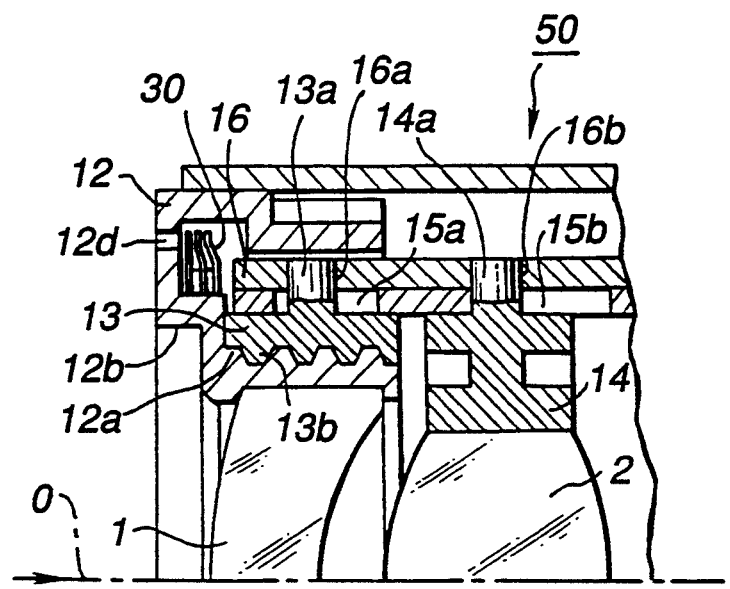

CAMERA SYSTEM

BACKGROUND OF THE INVENTION

1. Field of the Invention

The present invention relates to a camera system, and more particularly to a camera system having an arrangement that a conversion lens can be mounted/demounted with respect to a photographing lens of the camera.

2. Related Background Art

Conversion lenses which can be mounted/demounted with respect to a photographing lens of a camera are exemplified by tele-conversion lenses for lengthening the focal point distance, wide conversion lenses for shortening the focal point distance, and macro-conversion lenses (close-up lenses) for shortening the shortest photographing distance.

The tele-conversion lens is usually used to photograph sports scenes or wild animals and is used to obtain a telescopic effect when a remote object is photographed.

On the other hand, the wide conversion lens is used to obtain a wide-angle photographing effect, while the macro-conversion lens is used to approach an object which cannot be photographed by a photographing lens mounted on the body of the camera to obtain a larger photographing magnification.

If a range of the object distance which can be photographed is regarded, a tele-conversion lens, the size and the cost of which can be reduced, is provided by usually designing the tele-conversion lens such that satisfactory imaging performance can be exhibited when a focusing lens 1 of a photographing optical system composed of the focusing lens 1, a variator lens 2 and a relay lens 3 is used, as shown in FIG. 20, in only an extension range from an infinite photographing position to a predetermined position more adjacent to the remote side than the nearest photographing position. When the tele-conversion lens of a camera of the foregoing type is used, the photographing operation must be performed after the following fact has been confirmed: the object to be photographed is positioned more remote than a predetermined distance (for example, 3 m) which is more remote than a nearest distance (for example, 1 m) at which the photographing lens mounted on the body of the camera is able to photograph the object.

In order to use a macro-conversion lens, the design is so made that satisfactory imaging performance can be exhibited with the macro-conversion lens even if it is used in an extension quantity range from an infinite photographing position T to nearest end photographing position W as shown in FIG. 21. In this case, a macro-photographing effect can be obtained by designing the structure in such a manner that satisfactory imaging performance can be obtained even if the focusing lens 1 is further extended by a predetermined quantity than the nearest end photographing position W to be employed in an ordinary photographing operation.

If the focusing lens of the camera is so provided as to be capable of further extending by a predetermined quantity than the ordinary nearest end photographing position W, there is a fear at the time of using no macro-conversion lens that the focusing lens 1 is erroneously extended into a range which is allowed for the case where the macro-conversion lens is mounted. Therefore, a photograph, the image quality of which is unsatisfactory, can be taken due to the disorder of the aberration. Accordingly, an actual arrangement is so made that the focusing lens cannot be extended over an extension quantity allowed for a case where the conversion lens is not used even if the macro-conversion lens is mounted.

If the photographing lens, on which the conversion lens is mounted, is a zoom lens, the focal distance of the zoom lens is usually determined in such a manner that satisfactory imaging performance can be exhibited only when the zoom lens is used at a telescopic end or at a position adjacent to the telescopic end in order to provide a small and cost-reduced tele-conversion lens. In order to provide a small and cost-reduced wide conversion lens, the arrangement is usually made in such a manner that satisfactory imaging performance can be exhibited only when the zoom lens is used at a wide-angle end or at a position adjacent to the wide-angle end.

If a tele-conversion lens is used which is adapted to an instructed nearest distance which is made to be at a more remote position than the nearest distance which can be photographed by the photographing lens fastened to the camera body, there is a risk that an object is photographed at a shorter distance than the instructed distance due to leaving an operation of setting to the instructed nearest distance or to an error in eye-measurement. If the camera is operated ordinarily in this case, the taken photograph encounters deterioration in the image quality due to insufficient marginal illumination or disorder of the aberration.

If the macro-conversion lens is used, the photographing magnification is undesirably limited in order to prevent the foregoing erroneous use although a further high magnification photographing operation can be performed.

As for the focal distance of the zoom lens, a user sometimes photographs an object at another focal distance by using a tele-conversion lens designed to exhibit the optimum performance when it is used at only the telescopic end or at a position adjacent to the telescopic end or a wide conversion lens designed to exhibit the optimum performance when it is used at only the wide-angle end or at a position adjacent to the wide-angle end while leaving an operation of setting the zoom lens of the camera to the instructed focal point distances corresponding to the conversion lenses. If the camera is operated ordinarily in this case, the taken photograph similarly encounters deterioration in the image quality due to insufficient marginal illumination or disorder of the aberration.

SUMMARY OF THE INVENTION

A first object of the present invention is to provide a camera system capable of overcoming the foregoing problems.

A second object of the present invention is to provide a camera system capable of preventing an erroneous operation performed by a user when any one of a variety of conversion lenses is used and exhibiting the performance of each of the conversion lenses.

A third object of the present invention is to provide a camera system capable of exhibiting the performance of a conversion lens further satisfactorily as compared with a conventional camera.

In brief, according to one aspect of the invention, there is provided a camera on which a conversion lens is mounted at a position more forward than a photographing lens, the camera comprising: a focusing mechanism driven by an electric drive source; setting means for setting a focus distance made by the focusing mechanism to a desired value; detection means for detecting an extension quantity of the focusing lens group of the photographing lens and outputting a signal corresponding to the extension quantity; discrimination means for discriminating a state where the conversion lens is mounted and/or the type of the conversion lens to output a discrimination signal; and control means for monitoring the output from the detection means, controlling the operation of the electric drive source in accordance with an output from the setting means, and controlling the electric drive source to realize a focus distance within a range which corresponds to the state where the conversion lens is mounted and/or the type of the conversion lens and which can be photographed.

According to another aspect of the invention, there is provided a camera which incorporates a zoom lens and on which a conversion lens for changing the focal point distance of the zoom lens is detachably mounted, the camera comprising: electric drive means for causing a zooming operation to be performed; setting means for setting a focal point distance to a desired value; signal generating means for automatically or manually outputting a mounting signal and/or a conversion lens type indicating signal when the conversion lens is mounted; and control means for operating the electric drive means in accordance with an output from the setting means, and forcibly operating the electric drive means when the control means receives an output from the signal generating means until the focal distance is made to be an optically proper focal point distance if the focal point distance when the conversion lens is mounted is not an optically proper distance.

Other and further objects, features and advantages of the invention will be appear more fully from the following description.

When a variety of conversion lenses, the size and the cost of which can be reduced by limiting the distance from the camera to an object which can be used, is used in front of the lens of the camera, an erroneous photographing operation of the user, in which an object is photographed at a distance except for the instructed distance, is prevented. If the focal distance when the conversion lens is mounted is in a focal distance range which is not optically proper, it is forcibly made to be an optically proper focal point distance. Therefore, the erroneous operation performed by a user can be prevented at the time of using the various conversion lenses, and accordingly the performance of the conversion lens can be assuredly exhibited.

BRIEF DESCRIPTION OF THE DRAWINGS

FIG. 13 is a cross sectional view which illustrates an essential portion of a lens barrel of a camera system according to a second embodiment of the present invention;

FIG. 14 is a cross sectional view which illustrates an essential portion of a state where a tele-conversion lens is mounted on the lens barrel of the camera according to the second embodiment;

DETAILED DESCRIPTION OF PREFERRED EMBODIMENTS

Preferred embodiments of the present invention will now be described with reference to the drawings.

Although descriptions will be made about an arrangement in which the present invention is adapted to a camera incorporating a zoom optical system, the present invention can, of course, be adapted to a camera incorporating no zoom optical system but incorporating an ordinary photographing optical system.

The descriptions will be made about a lens arranged such that, when the wide conversion lens is mounted, the quantity of the lens extension for focusing can be made toward a shorter distance position by a predetermined quantity as compared with a normal state where the conversion lens is not mounted. Furthermore, when the macro-conversion lens is mounted, the lens can be extended more adjacent to the short distance position.

Figure 2:
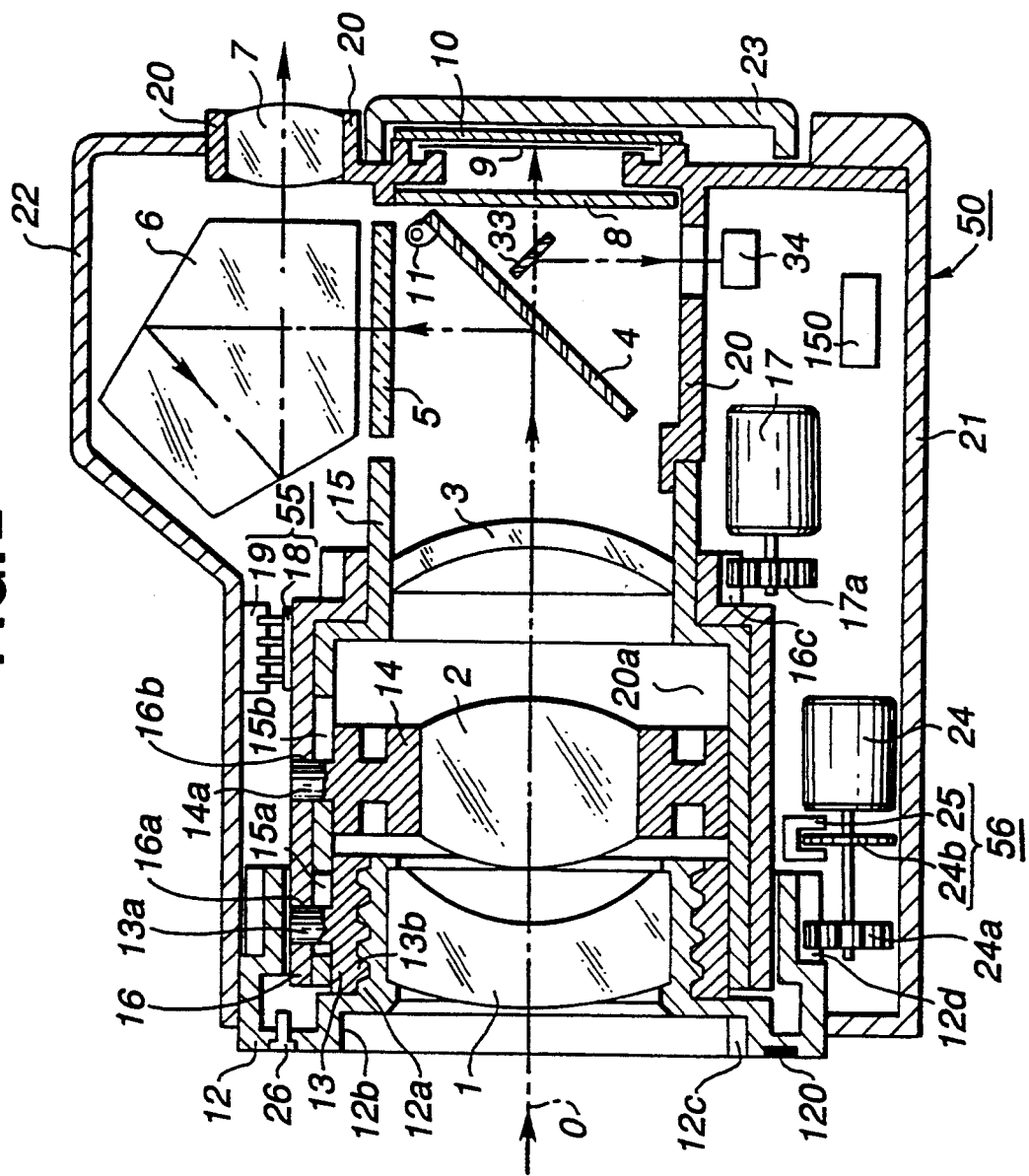
FIG. 2 is a vertical cross sectional view which illustrates an essential portion of a wide angle state of a camera of the camera system according to the first embodiment.

FIG. 2 is a cross sectional view which illustrates a camera 50 while mainly showing a zoom lens barrel in a case where a camera system according to a first embodiment of the present invention is adapted to a single lens reflex camera. An object of the photographing operation is positioned to the left of FIG. 2 (hereinafter called a "forward direction"). A state where the lens optical system is zoomed to the wide end is illustrated in FIG. 2.

Figure 20:
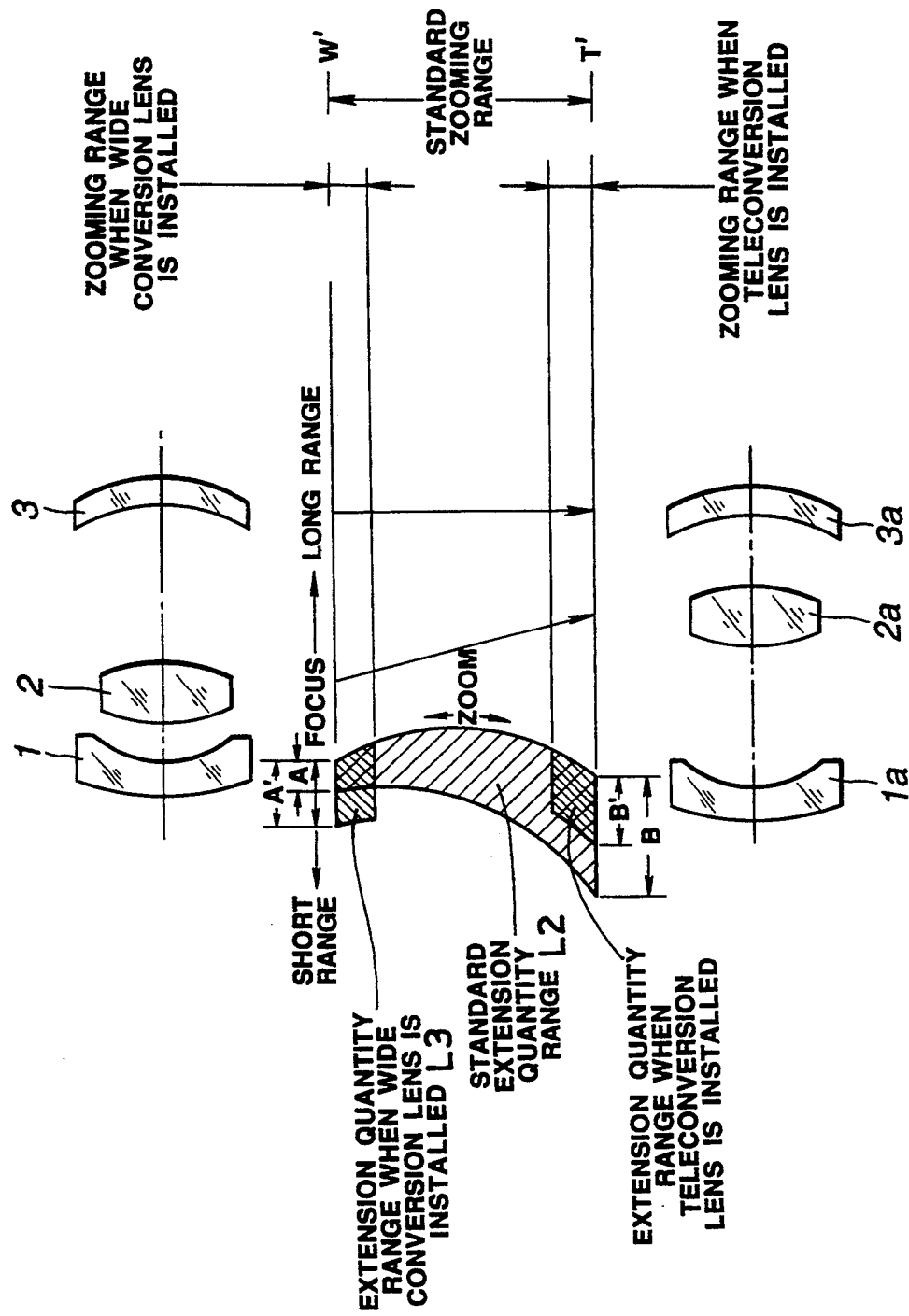
FIG. 20 illustrates a lens extension quantity when a conversion lens is mounted.
Figure 21:
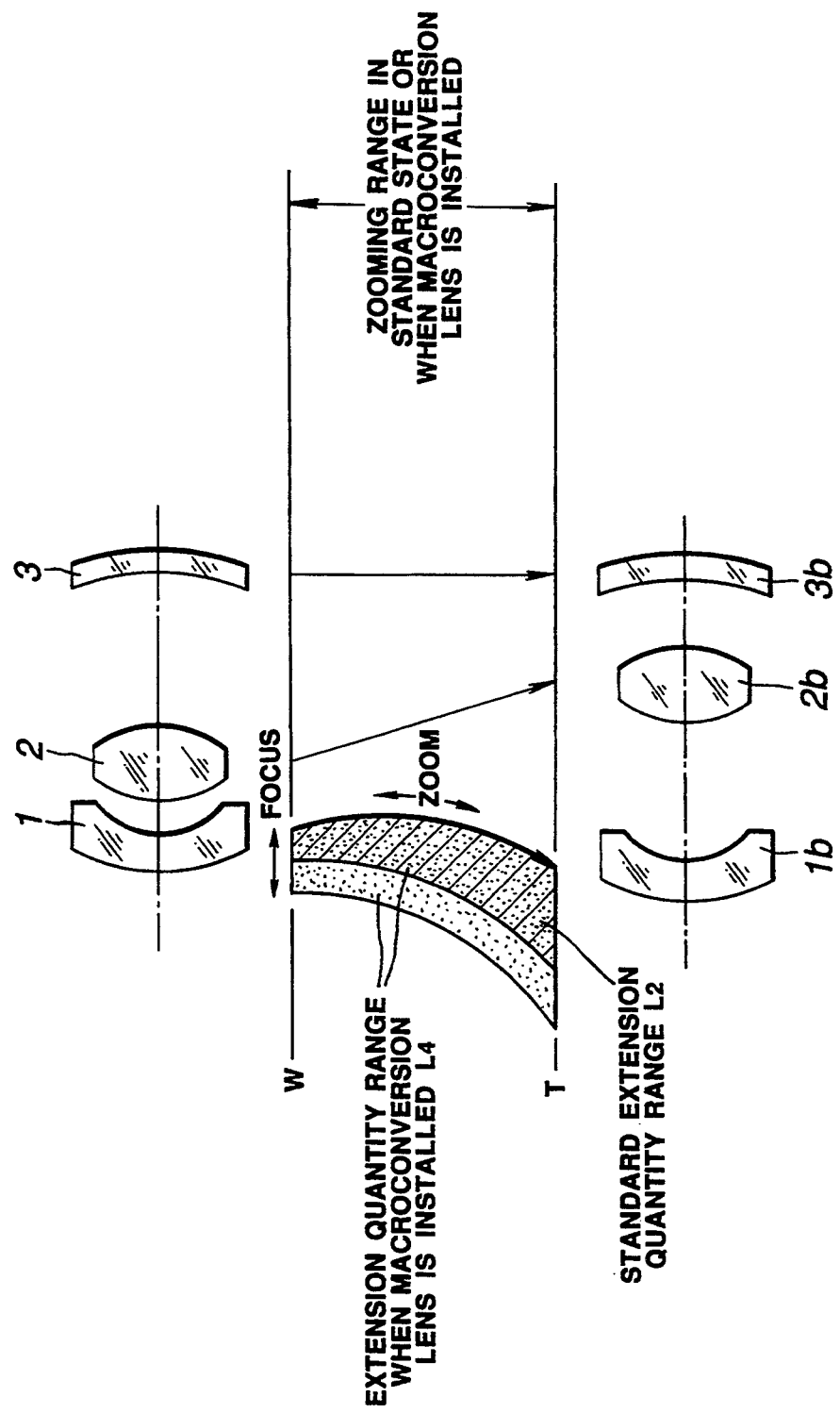
FIG. 21 illustrates a lens extension quantity when a macro-conversion lens is mounted.

The zoom lens barrel 20a is covered with a camera body 20, a lower cover 21 and an upper cover 22, the zoom lens barrel including a zoom lens group composed of three lenses, that is, a focusing lens 1, a variator lens 2 and a relay lens 3. As shown in FIGS. 20 and 21, when the focusing lens 1 and the variator lens 2 are longitudinally moved in the direction of optical axis O and the variator lens 2 is moved with respect to the focusing lens 1, a zooming operation is performed. When the focusing lens 1 is moved with respect to the variator lens 2 and the relay lens 3, a focusing operation is performed.

A fixed cylinder 15 for supporting the relay lens 3 is fixed to the camera body 20 and is extended forward, the fixed cylinder 15 having a linear-propagation guide groove 15a formed at a relatively front portion thereof along the optical axis and a linear-propagation guide groove 15b formed at an intermediate position thereof along the optical axis. The linear-propagation guide groove 15 a receives a drive pin 13a implanted in an intermediate cylinder 13 disposed at a relatively forward position in the lens barrel 20a. The linear-propagation guide groove 15b receives a drive pin 14a implanted in a second lens barrel 14 disposed at an intermediate position in the lens barrel 20a.

A cam cylinder 16 comprising a zoom ring formed into a cylinder is rotatably mounted around the fixed cylinder 15, while a second lens barrel 14 supporting the variator lens 2 and the intermediate cylinder 13 to engage the inner surface of the fixed cylinder 15. The intermediate cylinder 13 has a helicoid thread 13b formed in the inner surface thereof, the helicoid thread 13b to engaging a helicoid thread 12a of the first lens barrel 12 supporting the focusing lens 1.

In the camera body 20 behind the lens barrel 20a, a movable half mirror 4 is rotatably supported by a support shaft 11 at the top position thereof while making an angle of 45° relative to optical axis O. Furthermore, a finder optical system is disposed above the mirror 4, the finder optical system being composed of a focusing screen 5, a pentagonal prism 6 and an ocular lens 7. In addition, a movable auxiliary mirror 33 is disposed behind the mirror 4. Furthermore, a focal plane shutter 8 and a film 9 are respectively disposed to the rear of the mirror 4. The film 9 is so restricted by a pressing plate 10 provided for a rear cover 23 that the surface of the film 9 is made flat.

Figure 3:
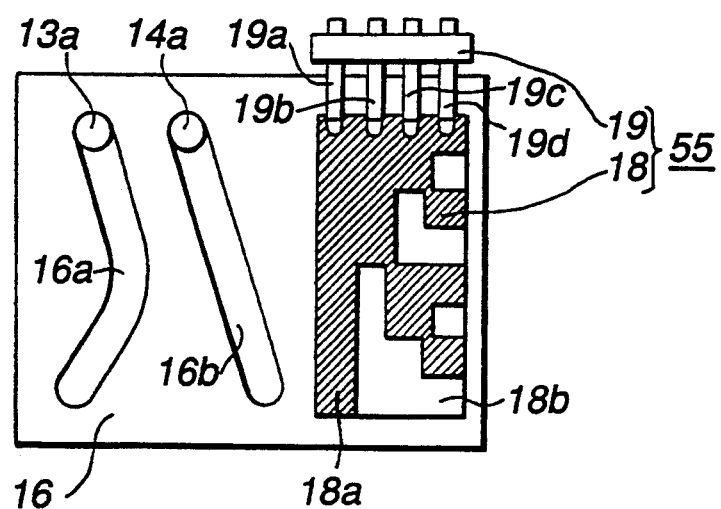
FIG. 3 is an developed view which illustrates an essential portion of a cam cylinder of a lens barrel of the camera shown in FIG. 2.

Furthermore, a focusing sensor 34 for detecting focus using light of the object reflected by the mirror 33 is disposed below the auxiliary mirror 33. In addition, an electric control unit including a CPU 150 is disposed in the lower portion of the camera body 20. Moreover, a zoom encoder 55 to be described later with reference to FIG. 3 is disposed above the lens barrel 20a and a distance encoder 56 is disposed below the lens barrel 20a.

The half mirror 4 is, as well known, statically positioned to make an angle of 45° with respect to the optical axis O as illustrated at the time of the observation performed through the finder. As a result, the half mirror 4 reflects light beams to a focusing screen 5 disposed above the half mirror 4, the light beams being beams which have passed through the photographing optical system composed of the focusing lens 1, the variator lens 2 and the release lens 3. Furthermore, the half mirror 4 transmits a portion of the light beams to cause the portion of the beams to be reflected by the auxiliary mirror 33. As a result, the reflected light beams are projected onto the focusing sensor 34. The light beams reflected to the focusing screen 5 are observed as an erected normal image by the pentagonal prism 6 and the ocular lens 7. At the time of photographing an object, the half mirror 4 and the auxiliary mirror 33 are moved away from the range of the optical path through which the photographing light beams pass.

The drive pins 13a and 14a respectively received by the linear-propagation guide grooves 15 a and 15b of the fixed cylinder 15 penetrate the linear-propagation guide grooves 15 a and 15b to be received by spiral cam grooves 16a and 16b (to be described later) of the cam cylinder 16. The cam cylinder 16 has a drive gear 16c on the outer surface of the rear end portion thereof. A pinion gear 17a fixed to the output shaft of a zoom drive motor 17 engages gear 16c so that the cam cylinder 16 is rotated when the motor 17 is rotated. As a result, a zooming operation is performed.

That is, when the zooming operation is performed in the wide angle direction, the cam cylinder 16 is rotated clockwise when viewed from the direction of the object. As a result, the drive pins 13a and 14a are linearly moved in the direction of the optical axis O by the spiral cam grooves 16a and 16b of the cam cylinder 16 while being guided by the linear-propagation guide grooves 15 a and 15b of the fixed cylinder 15 in the direction of the optical axis. As a result, the focusing lens 1 and the variator lens 2 are moved to a predetermined wide-angle position. Thus, the zooming operation is completed. Simultaneously, each contact of a zoom encoder switch 19 slides on an encoder pattern 18 due to the rotation of the cam cylinder 16. As a result, the encoder 55 transmits an encoded output corresponding to the wide-angle position. If zooming is performed in the telescopic direction, that is, toward the long focal point, the cam cylinder 16 is rotated counterclockwise when viewed from a position adjacent to the object. As a result of the rotation thus performed, the drive pins 13a and 14a are linearly moved in the direction of the optical axis by the cam grooves 16a and 16b while being guided in the direction of the optical axis. As a result, the focusing lens 1 and the variator lens 2 are moved to a predetermined telescopic photographing position. Thus, the zooming operation in the telescopic photographing direction is completed. Similar to the wide direction zooming operation, each contact of the zoom encoder switch 19 slides on the encoder pattern 18 so that an encode output corresponding to the telescopic photographing position is transmitted from the encoder 55.

As shown in FIG. 3, the zoom encoder 55 is composed of the zoom encoder pattern 18 disposed on the cam cylinder 16 and the zoom encoder switch 19 fixed to the upper cover 22. The zoom encoder pattern 18 composed of a conductive pattern 18a and an insulating pattern 18b is disposed on the outer surface of rear portion of the cam cylinder 16. Furthermore, the encoder switch 19 is fixed to the upper cover 22 at a position to correspond to the pattern 18. A common contact 19a and other contacts 19b, 19c and 19d of the switch 19 are slidably positioned on the pattern 18. As a result, when the cam cylinder 16 is rotated due to the foregoing zooming operation, a zoom signal is transmitted from the encoder switch 19.

The first lens barrel 12 disposed at the leading portion of the lens barrel 20a is composed of outer and inner short cylinders, the leading portions of which are connected to each other by a wall surface. The focusing lens 1 is supported in the inner short cylinder. The first inner short cylinder of the first lens barrel 12 has the helicoid thread 12a on the outer surface thereof. Furthermore, a drive gear 12d is formed on the outer surface of the rear portion of the outer short cylinder. In addition, a pinion gear 24a fixed to the output shaft of a focus driving motor 24 engages drive gear 12d. When the focus drive motor 24 is rotated, the first lens barrel 12 is rotated, causing the helicoid thread 12a to move with respect to the helicoid thread 13b. As a result, a focusing operation is performed.

Figure 4:
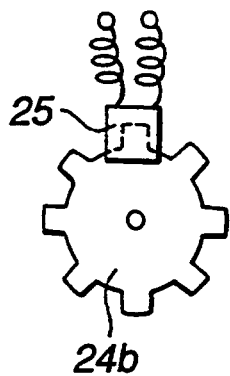
FIG. 4 is a front elevational view which illustrates a distance encoder of the camera shown in FIG. 2.

The distance encoder 56 is disposed on the output shaft of the focus drive motor 24, the distance encoder 56 being fixed to the output shaft of the motor 24 as shown in FIG. 4. The distance encoder 56 is composed of a rotor 24b having counting projections formed at uniform intervals on the outer periphery of the rotor 24b and a photo-interrupter 25 having a light emitting portion and a light receiving portion which face each other while interposing the passage for the projections of the rotor 24b. The distance encoder 56 detects the quantity of rotation of the focus drive motor 24.

Referring back to FIG. 2, a mounting member for a conversion lens to be described later is formed on the wall surface of the front end portion of the first lens barrel 12. The mounting member is formed into a circular recess formed toward the lens 1, the mounting member having an inner portion 12b including a key groove 12c for controlling the angular orientation at the time of mounting the conversion lens. The inner portion 12b further includes a fixed contact 26 assembly composed of electric contacts 26a and 26b for discriminating the type of conversion lens and a fact whether or not the conversion lens has been mounted.

Figure 5:
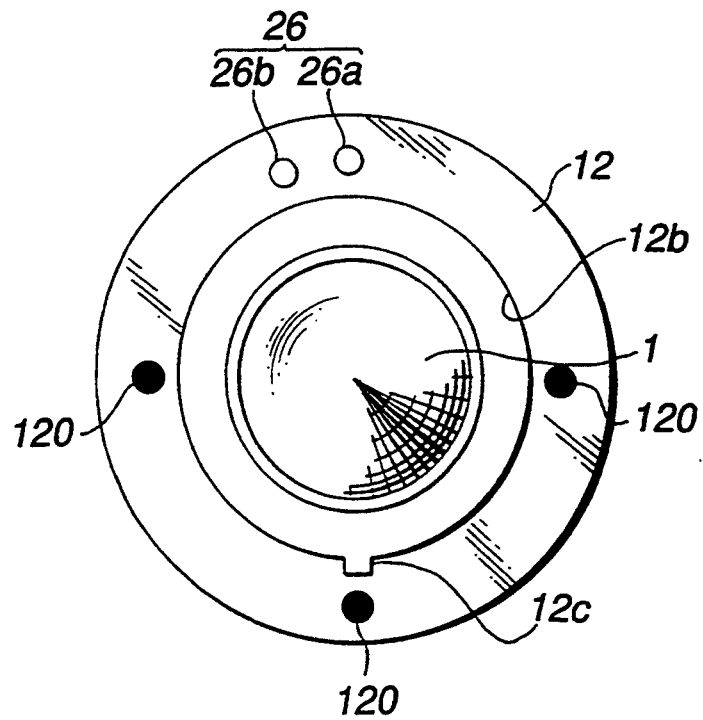
FIG. 5 is a front elevational view which illustrates an essential portion of the front surface of a first lens frame of the lens barrel of the camera shown in FIG. 2.
Figure 6:
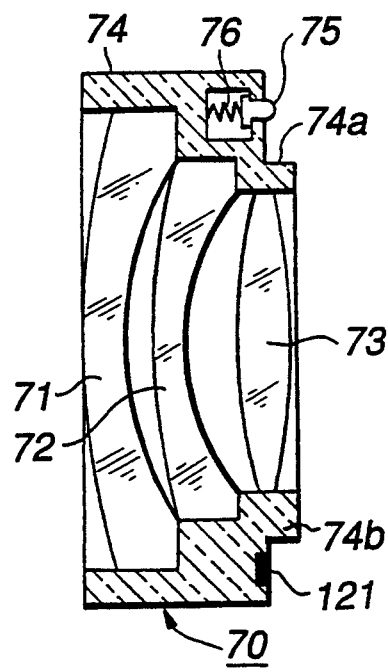
FIG. 6 is a cross sectional view which illustrates a wide conversion lens to be mounted on the lens barrel of the camera shown in FIG. 2.
Figure 7:
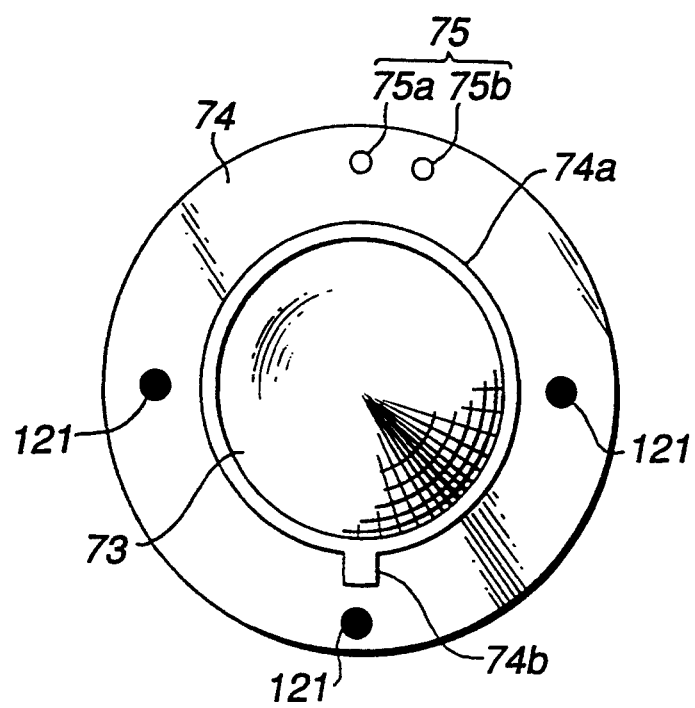
FIG. 7 is a back side view which illustrates the wide conversion lens shown in FIG. 6.

FIGS. 6 and 7 respectively are a cross sectional view and a rear view of a conversion lens 70 to be mounted to the camera 50. A fixed cylinder 74 including lenses 71, 72 and 73 supported therein has a lens mount portion 74a detachably fastened to the mounting member of the camera in the rear end portion thereof, the lens mount portion 74a having an outer diameter to be received by the inner portion 12b of the mounting member. Furthermore, a key 74b to be received by the key groove 12c (see FIG. 5) of the camera is formed around the mount portion 74a. Moreover, a movable contact assembly 75 composed of electric contacts 75a and 75b each projected rearwards by a compression coil spring 76 is disposed on the back side of the fixed cylinder 74 on the outside of the mount portion 74a. As a result, when the conversion lens 70 is mounted on the camera, the movable contact assembly 75 comes in contact with the electric contacts 26a and 26b (see FIG. 5) of the camera. Furthermore, a resistor 163 (see FIG. 1) peculiar to the conversion lens and disposed in the fixed cylinder 74 is fixed to (i.e. connected across) the electric contacts 75a and 75b.

Figure 8:
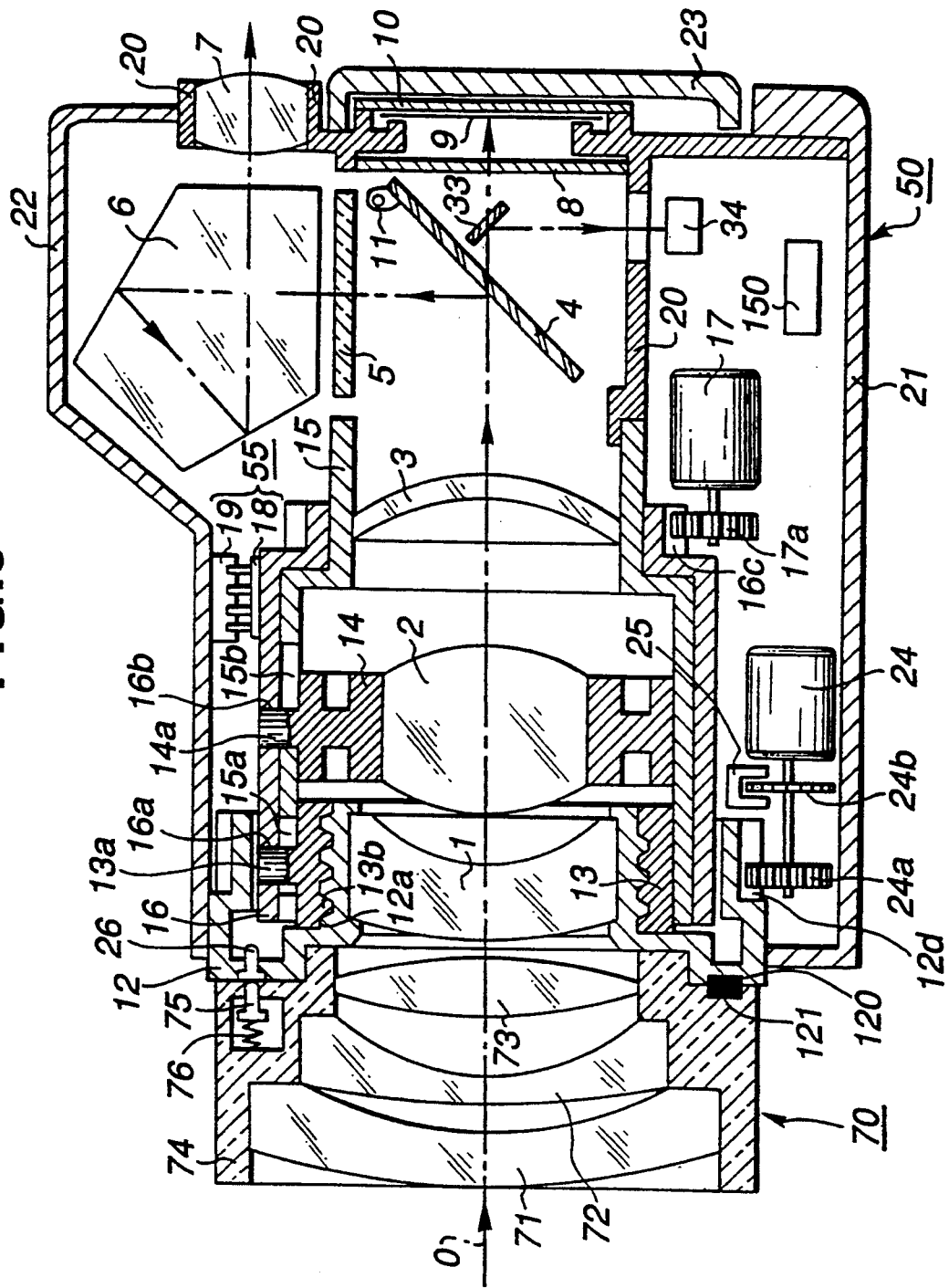
FIG. 8 is a cross sectional view which illustrates a state where the wide conversion lens shown in FIGS. 6 and 7 is mounted on a camera shown in FIG. 2.

FIG. 8 illustrates a state where the wide conversion lens 70 is mounted on the camera. The focal point distance of this camera is made to be the wide angle end due to an operation sequence to be described later.

Figure 9:
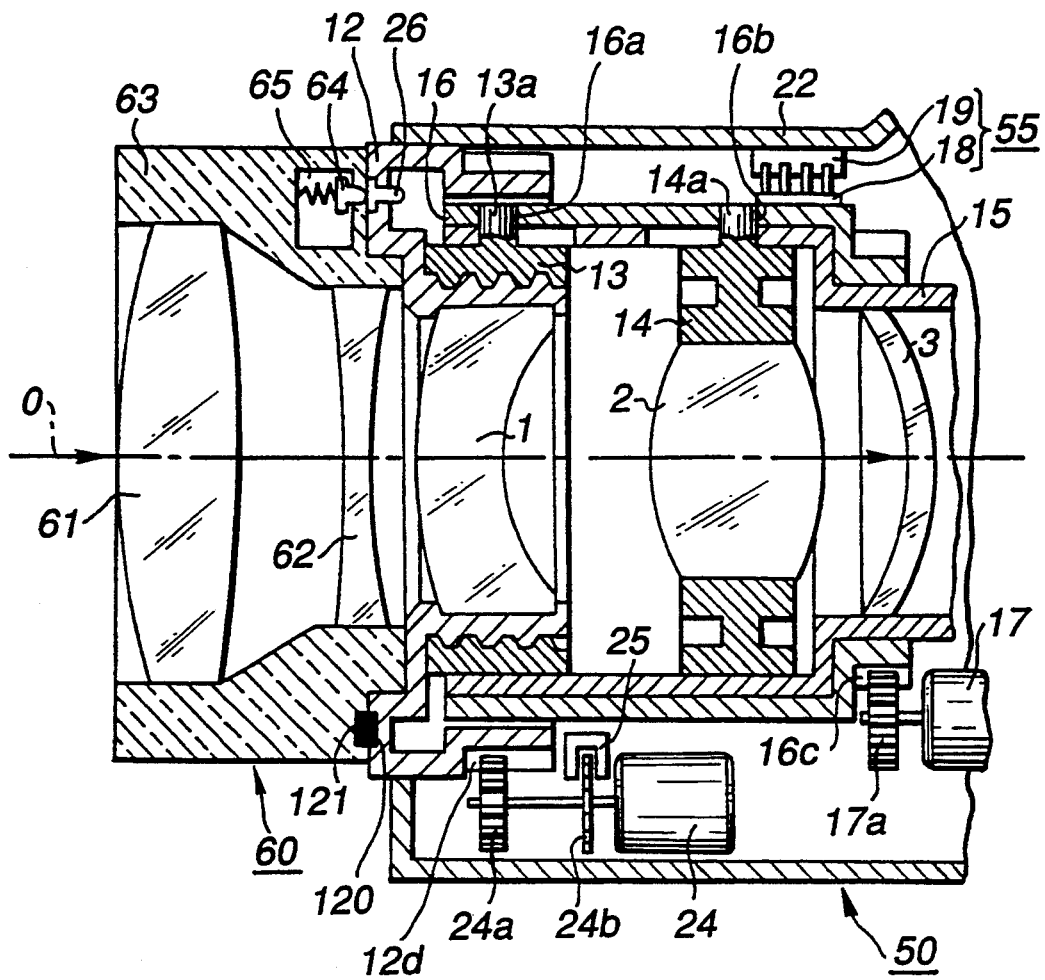
FIG. 9 is a cross sectional view which illustrates a state where a tele-conversion lens is mounted in a telescopic state of the camera shown in FIG. 2.
Figure 10:
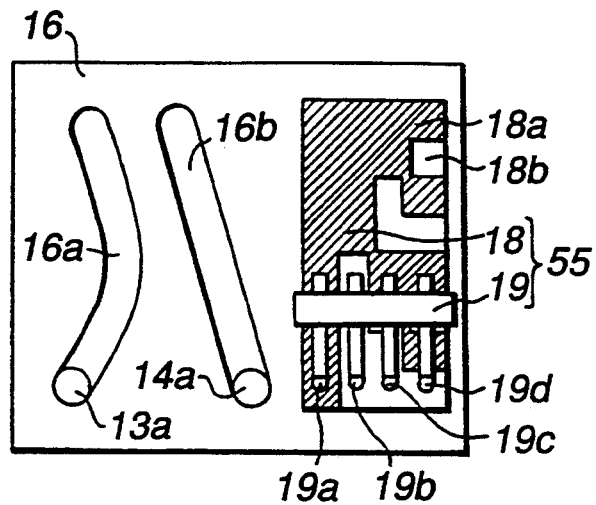
FIG. 10 is a developed view which illustrates an essential portion of a cam cylinder of the lens barrel shown in FIG. 9.

FIG. 9 illustrates a state where a tele-conversion lens 60 is mounted on the camera 50. The tele-conversion lens 60 has a fixed cylinder 63 including lenses 61 and 62 fixed therein. A lens mount portion formed into a shape similar to that of the wide conversion lens 70 is formed at the rear end portion of the fixed cylinder 63. Furthermore, a movable contact assembly 64 composed of two electric contacts and a compression coil spring is arranged similar to the contact assembly of the wide conversion lens 70. However, a resistor having a resistance value peculiar to the tele-conversion lens is connected to the two electric contacts. In a state where the tele-conversion lens 60 is mounted on the camera, the focal point distance of the camera is made to be the telescopic end due to the operation sequence to be described later. The states of the zoom encoder 55 and that of the cam cylinder 16 at this time are as shown in FIG. 10.

Referring to FIGS. 2, and 5 to 9, reference numerals 120 and 121 represent a permanent magnet and a member to be attracted by the permanent magnet to assuredly mount the conversion lens on the front portion of the zoom lens barrel. The attraction force is made to be a level at which the aforesaid two elements can be manually separated from each other. A means for maintaining the state of mounting is not limited to the attraction means using the permanent magnet. A variety of means such as a known bayonet mount means and a thread fastening means may, of course, be employed.

Figure 1:
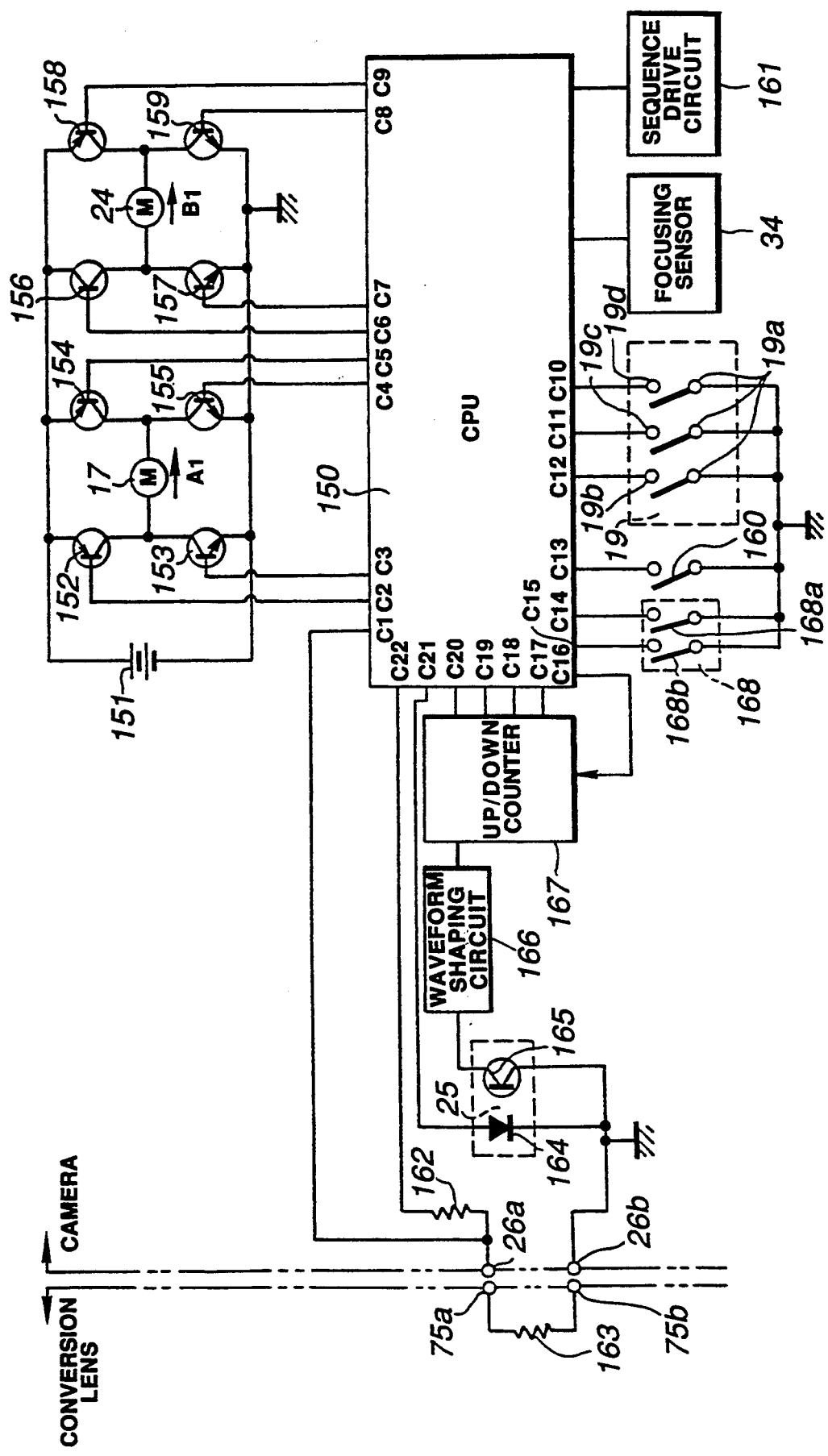
FIG. 1 is a block diagram which illustrates the structure of an electric circuit for use in a camera system according to a first embodiment of the present invention.

The structure of an electric circuit for use in the camera system according to the first embodiment will now be described with reference to FIG. 1. The operation of each circuit shown in FIG. 1 is sequentially controlled by a CPU 150. A tele-zoom switch 168a and a wide zoom switch 168b respectively connected to input terminals C14 and C15 of the CPU 150 are external operation switches for zooming the photographing lens. When the tele-zoom switch 168a has been switched on, the CPU 150 discriminates that a command of performing zooming to the long focal point has been made, and lowers the level of an output terminal C2 and raises the level of an output terminal C4. As a result, transistors 152 and 155 are turned on, causing the zoom motor 17 to be rotated forward with an electric current supplied from a power source 151 in a direction designated by an arrow A1. Hence, zooming to the long focal point is performed. The foregoing zooming operation is continued until the tele-zoom switch 16 is switched off or until input terminals C10, C11 and C12 of the CPU 150 detect a fact that the photographing lens has been brought to the longest focal point and all of the switches of the zoom encoder switch 19 composed of the common contact 19a and contacts 19b, 19c and 19d and arranged to detect the status of the zoom encoder 55 (see FIGS. 2 and 3) have been switched off.

When the wide zoom switch 168b has been switched on, the CPU 150 discriminates that a command of performing zooming to the short focal point has been made, and raises the level of an output terminal C3 and lowers the level of an output terminal C5. As a result, transistors 153 and 154 are turned on, causing the zoom motor 17 to be rotated reversely. As a result, zooming to the short focal point is performed. The foregoing zooming operation is continued until the CPU 150 detects a fact that the photographing lens has been brought to the shortest focal point and all of the switches of the zoom encoder switch 19 have been switched on.

A release switch 160 connected to an input terminal C13 of the CPU 150 is an external operation switch. When the release switch 160 is switched on, the CPU 150 discriminates that a release command has been made, and performs the release operation.

An electric circuit of a means for detecting the quantity of extension of the focusing lens 1 by means of the photo-interrupter 25 of the distance encoder 56 will now be described. When the CPU 150 has raised the level of an output terminal C21 thereof, an LED 164 constituting the photo-interrupter 25 is brought into a light emission state. A waveform shaping circuit 166 shapes the waveform of a signal current supplied from a photo-transistor 165 to transmit a rectangular pulse to an up/down counter 167.

The CPU 150 controls the level of the output from an output terminal C16 thereof corresponding to the direction of the rotation of the focusing motor 24 to change over increase/decrease in the count of the up/down counter 167. The CPU 150 reads the count made by the counter 167 through input terminals C17 to C20 thereof. The count corresponds to the quantity of the extension of the focusing lens 1. By resetting the up/down counter 167 at a position at which the lens 1 has been the most contracted, the absolute value of the quantity of the extension of the focusing lens 1 can be detected.

The focusing sensor 34 is a sensor for detecting the quantity and the direction of defocus of the lens. If the CPU 150 has discriminated in accordance with the output from the focusing sensor 34 that the focusing lens 1 is extended by a predetermined quantity, the CPU 150 lowers the level of an output terminal C6 and raises the level of an output terminal C8. As a result, transistors 156 and 159 are turned on, causing the focusing motor 24 to be rotated forwards with an electric current supplied from the power source 151 in a direction designated by an arrow B1. As a result, the focusing operation in the extension direction is performed. The foregoing focusing operation is continued until the focusing lens 1 is extended to a desired position in accordance with the output from the distance encoder 56 (see FIG. 2).

If the CPU 150 has been discriminated in accordance with the output from the focusing sensor 34 that the focusing lens 1 is contracted by a predetermined quantity, the CPU 150 raises the level of an output terminal C7 and lowers the level of an out terminal C9. As a result, transistors 157 and 158 are turned on, causing the focusing motor 24 to be rotated reversely. Hence, the focusing operation in the contraction direction is performed. The foregoing focusing operation is continued until the focusing lens 1 is contracted to a desired position in accordance with the output from the distance encoder 56.

A sequence drive circuit 161 is a circuit for operating a mechanism for operating the movable half mirror 4 and the movable auxiliary mirror 33 (see FIG. 2), a known photometry device, a diaphragm drive mechanism, a shutter charging mechanism and a film winding mechanism in response to a signal transmitted from the CPU 150.

A circuit for discriminating the type of the conversion lens to be mounted on the front end portion of the lens barrel 20a will now be described. When the CPU 150 has raised the level of its output terminal C22 and accordingly a standard voltage is applied, voltage divided by a predetermined resistor 162 and a resistor 163 having a resistance value determined by the type of the conversion lens is applied to the input terminal C1 which is an A/D port. As a result, the CPU 150 is able to detect the type of the conversion lens and a fact whether or not the conversion lens has been mounted.

Figure 11:
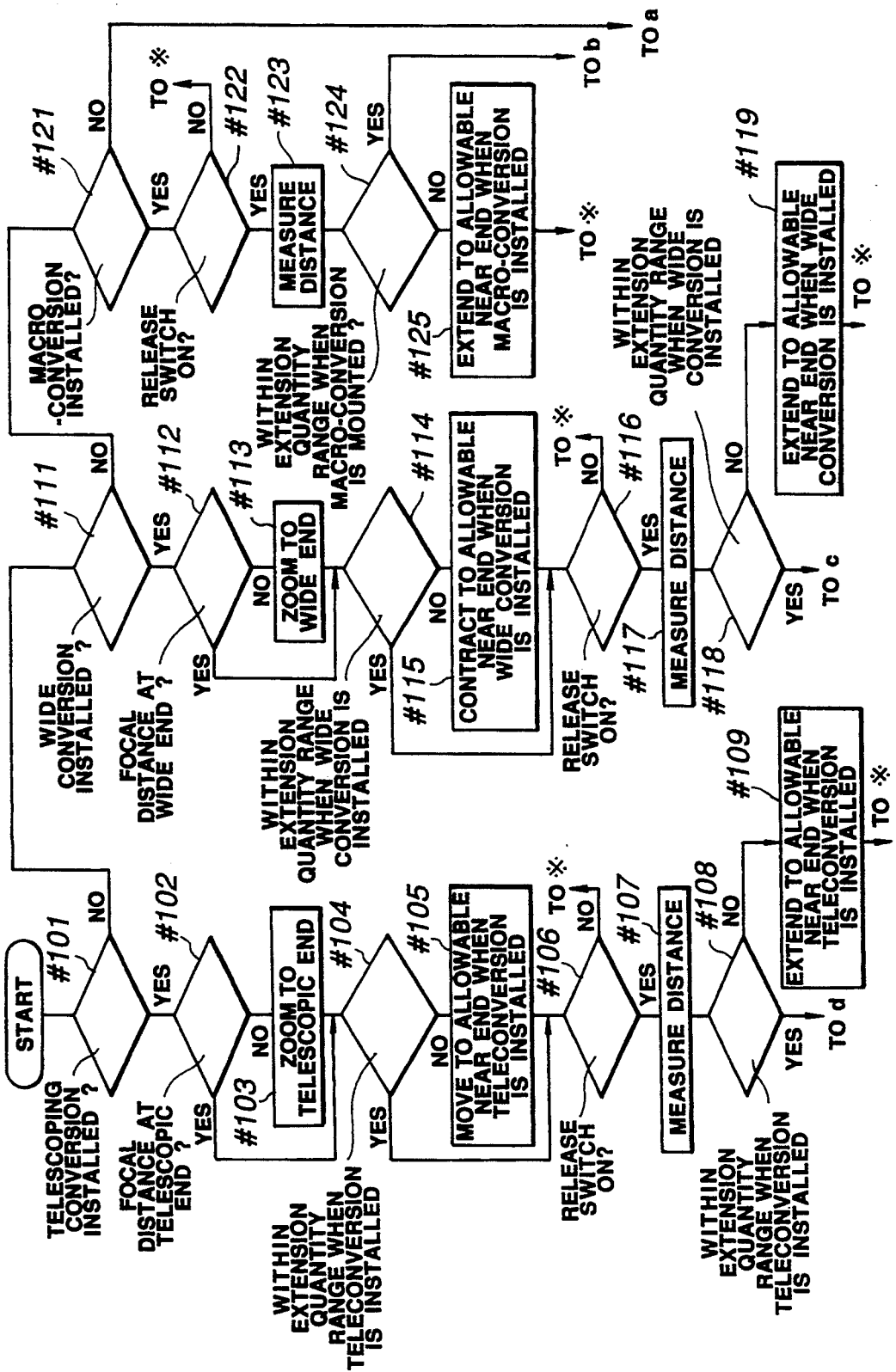
FIG. 11 is a flow chart which illustrates a photographing sequence adapted to the camera according to the first embodiment.
Figure 12:
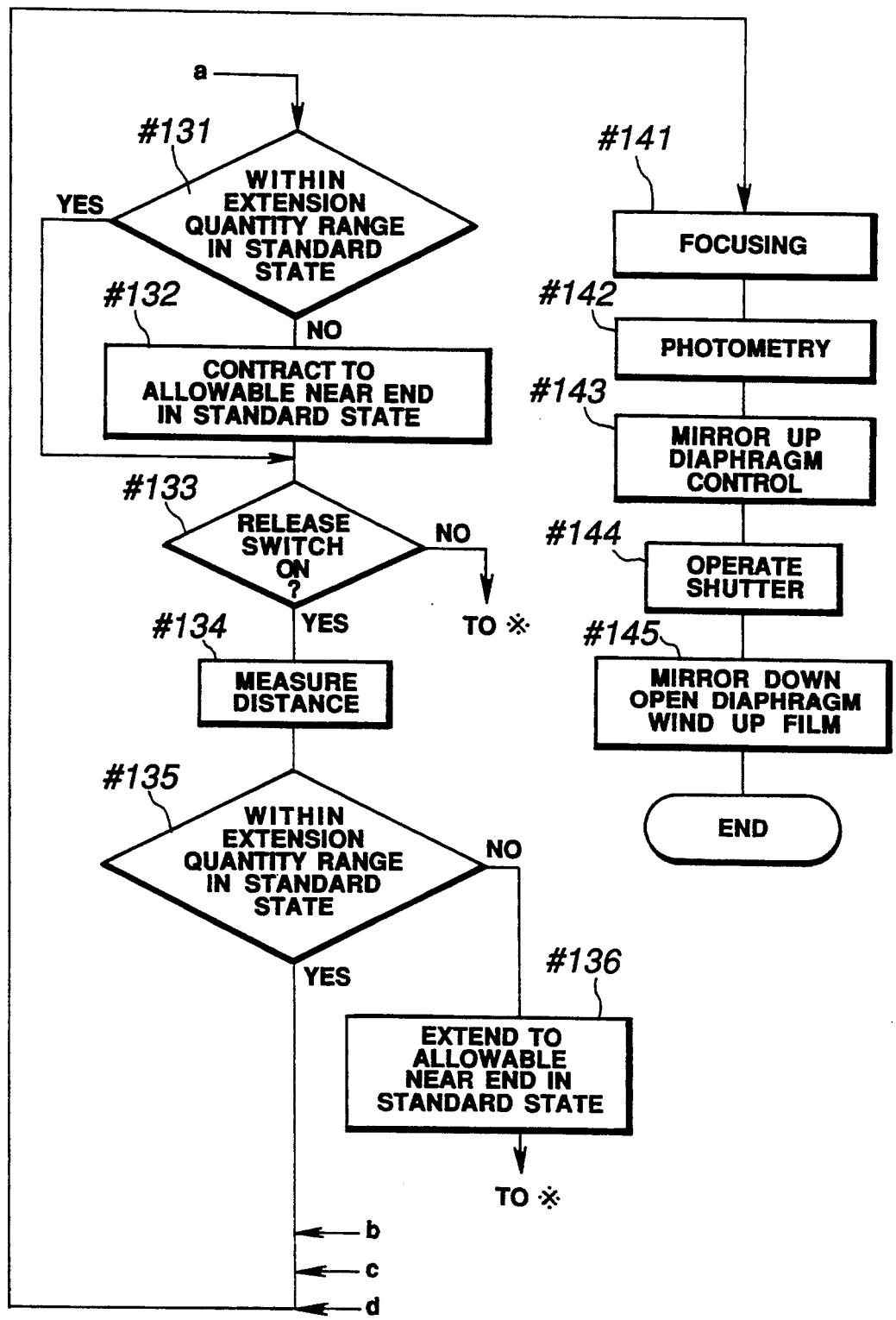
FIG. 12 is a flow chart which illustrates a photographing sequence adapted to the camera according to the first embodiment.

The photographing sequence according to the first embodiment thus constituted will now be described with reference to a flow chart shown in FIGS. 11 and 12. FIGS. 11 and 12 show one flow chart in cooperation with each other, where the continuity of the flow is expressed with symbols a, b, c and d.

Each conversion lens according to this embodiment is designed to be used in the following region in order to exhibit satisfactory imaging performance in spite of its reduced size.

Since the tele-conversion lens 60 is used in order to obtain a telescopic effect which cannot be obtained when a zoom lens mounted on a camera is used, it is arranged to exhibit satisfactory imaging performance only when the zoom lens of the camera is used at the telescopic end. Since the wide conversion lens 70 is used to obtain a wide angle effect which cannot be obtained when the zoom lens mounted on the camera is used, it is arranged to exhibit satisfactory imaging performance only when the zoom lens of the camera is used at the wide angle end.

Furthermore, the quantity of extension of the focusing lens 1 varies depending upon the type of the conversion lens but it is arranged to satisfactorily meet the condition for use of each conversion lens. That is, the extension quantity B' when the tele-conversion lens is mounted is limited at the near position with respect to extension quantity B at the telescopic end when the lens is extended by a quantity L2 in a standard state where the conversion lens is not mounted. When the wide conversion lens is mounted, the extension quantity can be enlarged as A' toward a shorter distant point with respect to extension quantity A at the wide angle end. Since the macro-conversion lens is used to approach the object to a distance which cannot be photographed by the lens mounted on the camera to obtain a further high photographing magnification, the quantity of extension is, as shown in FIG. 21, further enlarged as compared with the limit extension quantity so that the object can be photographed at a shorter distance. In this case, extension quantity L4 is further enlarged toward the shorter distance position than the extension quantity A' when the wide conversion lens is mounted.

The flow shown in FIG. 11 proceeds as follows: when the CPU 150 has discriminated in step #101 that the tele-conversion lens has been mounted, a discrimination is made in step #102 in accordance with the output from the zoom encoder 55 as to whether or not the focal point distance is at the telescopic end. If the focal point distance is not at the telescopic end, the zoom motor 17 is rotated in step #103 to perform zooming to the telescopic end.

In step #104, the count of the up/down counter 167 (see FIG. 1) is monitored to discriminate whether or not the extension quantity of the focusing lens 1 is included in the extension quantity range when the tele-conversion lens is mounted. If the extension quantity is not included in the foregoing range, the focusing motor 24 is rotated in step #105 to move the focusing lens 1 to the allowable nearest end.

In next step #106, whether or not the release switch 160 is switched on is monitored. If the release switch 160 is switched off and accordingly the releasing operation is not performed, the flow returns to the start position of the flow chart, that is, step #101 as represented by the symbol ✵. If a fact that the release switch 160 has been switched on is detected, the output from the focusing sensor 34 is monitored in steps #107 and #108 to calculate the quantity of movement of the focusing lens 1 from the defocusing direction and the quantity of the defocus. Furthermore, the extension quantity of the focusing lens 1 after the focusing lens 1 has been moved is included in the range of the extension quantity when the tele-conversion lens is mounted.

If a result of the calculation shows that the extension quantity is not included in the foregoing range, the focusing lens 1 is extended to the allowable nearest end when the tele-conversion lens is mounted, and the flow returns to step #101. Since a user is able to recognize the limit of the nearest end because the camera does not proceed to the next process, accordingly an erroneous operation is prevented. If a discrimination is made in step #108 that the extension quantity is included by the foregoing range, the flow proceeds to step #141 shown in FIG. 12 in which the focusing motor 24 is operated while monitoring the distance encoder 56. Furthermore, the focusing lens 1 is moved to the calculated position. Thus, the focusing operation is completed.

In steps #142 to #145, the sequence drive circuit 161 is operated so that following sequential photographing operations for one frame are completed: a photometry operation, a mirror raising operation, a diaphragm control operation, a shutter moving operation, a mirror lowering operation, a diaphragm opening operation, and an operation of winding a film by a distance corresponding to one frame.

If the CPU 150 has discriminated in step #101 shown in FIG. 11 that the tele-conversion lens is not mounted, a state where the wide conversion lens is mounted is discriminated in step #111. If a fact that the wide conversion lens has been mounted is discriminated, the focal point distance is at the wide angle end is discriminated in step #112 in accordance with the output from the zoom encoder 55. If the focal point is not at the wide angle end, the zoom motor 17 is rotated in step #113 so that zooming to the wide angle end is performed. In next step #114, the count of the up/down counter 167 is monitored so that a discrimination is made as to whether or not the extension quantity of the focusing lens 1 is included in the extension quantity range when the wide conversion lens is mounted. If the extension quantity is not included in the foregoing range, the focusing motor 24 is rotated in step #115 so that the focusing lens 1 is contracted to the allowable nearest end.

In next step #116, whether or not the release switch 160 is switched on is monitored. If the release operation is not being performed, the flow returns to the start position of the flow chart, that is, step #101. If a discrimination is made that the release switch 160 has been switched on, the output from the focusing sensor 34 is monitored in steps #117 and #118 to calculate the quantity of movement of the focusing lens 1 from the direction and the quantity of the defocus. Then, a discrimination is made as to whether or not the extension quantity of the focusing lens 1 after it has been moved is included in the range of the extension quantity when the wide conversion lens is mounted.

If the result of the calculation shows that the foregoing extension quantity is not included in the extension quantity, the focusing lens 1 is, in step #119, extended to the allowable nearest end when the wide conversion lens is mounted. Then, the flow returns to step #101. AS a result, the user is able to recognize the limit of the nearest end because the camera does not proceed to the next process, and accordingly an erroneous operation can be prevented.

If a discrimination is made in step #118 that the extension quantity is included in the foregoing range, the flow proceeds to step #141 shown in FIG. 12 in which the focusing motor 24 is rotated while monitoring the distance encoder 56. Furthermore, the focusing lens 1 is moved to the calculated position, and the focusing operation is completed. Then, the sequential operations are completed in steps #142 to #145 similar to the case where the tele-conversion lens is mounted.

If a discrimination is made by the CPU 150 in step #111 shown in FIG. 11 that the wide conversion lens is not mounted, the state where the macro-conversion lens is mounted is discriminated in next step #121.

If a discrimination that the macro-conversion lens has been mounted is made, monitoring of the focal point distance and the extension quantity is not performed and the flow proceeds to step #122 because of the following reason: the macro-conversion lens according to this embodiment can be used in the overall range of the focal point distance of the zoom lens mounted on the camera and it is designed to cause the focusing lens 1 to be extended by a degree larger than the degree in the other states.

In step #122, whether or not the release switch 160 has been switched on is monitored. If the release operation is not being performed, the flow returns to the start position of the flow chart, that is, step #101. If a fact that the release switch 160 has been switched on is detected, the output from the focusing sensor 34 is monitored in steps #123 and #124. Furthermore, the quantity of the movement of the focusing lens 1 is calculated from the direction and the quantity of the defocus. Furthermore, a discrimination is made as to whether or not the extension quantity of the moved focus lens 1 is included in the extension quantity range when the macro-conversion lens is mounted.

If the result of the calculation shows that the extension quantity is not included in the foregoing range, the focusing lens 1 is, in step #125, extended to the allowable nearest end when the macro-conversion lens is mounted. Then, the flow returns to step #101. Therefore, the user is able to recognize the limit of the nearest end because the camera does not proceed to the next process, and accordingly an erroneous photographing operation can be prevented. If a discrimination is made in step #124 that the extension quantity is included in the foregoing range, the flow proceeds to step #141 shown in FIG. 12 in which the focusing motor 24 is rotated while monitoring the distance encoder 56. As a result, the focusing lens 1 is moved to the calculated position, and the focusing operation is completed. Then, the sequential operations are completed in steps #142 to #145 similar to the case where the other conversion lens is mounted.

If a discrimination is made by the CPU 150 in step #121 that the macro-conversion lens is not mounted, the CPU 150 discriminates that no conversion lens is mounted on the camera and branches to step #131. In step #131 shown in FIG. 12, the count of the up/down counter 167 is monitored so that a discrimination is made as to whether or not the extension quantity of the focusing lens 1 is included in the extension quantity range in the standard state. If the extension quantity is not included in the foregoing range, the focusing motor 24 is rotated in step #132 to contract the focusing lens 1 to the allowable nearest end.

In next step #133, whether or not the release switch 160 is switched on is monitored. If the releasing operation is not performed, the flow returns to the start position of the flow chart, that is, step #101. If a fact that the release switch 160 has been switched on is detected, the output from the focusing sensor 34 is monitored in steps #134 and #135. As a result, the quantity of the movement of the focusing lens 1 is calculated from the direction and the quantity of defocus. Furthermore, a discrimination is made as to whether or not the extension quantity of the moved focusing lens 1 is included in the extension quantity range in the standard state.

If the result of the calculation shows that the extension quantity is not included in the foregoing range, the focusing lens 1 is extended to the allowable nearest end in the standard state in step #136. Then, the flow returns to the start position of the flow chart. Therefore, the user is able to recognize the limit of the nearest end because the camera does not proceed to the next process, and accordingly an erroneous photographing operation can be prevented.

If a discrimination is made in step #135 that the extension quantity is included in the foregoing range, the flow proceeds to step #141 in which the focusing motor 24 is rotated while monitoring the distance encoder 56 to move the focusing lens 1 to the calculated position. Thus, the focusing operation is completed. Then, the sequential operations are completed in steps #142 to #145 similar to the case where one of the other conversion lenses is mounted.

According to the foregoing first embodiment, the focal point distance of the lens of the camera is limited at the time of the photographing operation. Therefore, an erroneous use by an operator such as the photographing operation is performed at a focal point distance which is not instructed can be prevented in a case where any one of a variety of conversion lenses is mounted on a camera on which the zoom lens is mounted and the photographing operation is performed. Therefore, the performance of each of the various conversion lenses can be exhibited assuredly.

FIGS. 13 to 17 illustrate a second embodiment of the present invention. The foregoing first embodiment has the arrangement that the signal generating means for automatically or manually transmitting a mounting signal and/or conversion lens type indicating signal at the time of mounting the conversion lens comprises the resistor 163 (see FIG. 1). The second embodiment has an arrangement that the function of the signal generating means is realized by changing the lengths of projections 66 and 76 (see FIGS. 14 and 15) formed on the back side of the conversion lens as described later. The residual arrangements are the same as the first embodiment. Therefore, the same elements are given the same reference numerals and their descriptions are omitted here. The description will be made about only the signal generating means.

Figure 15:
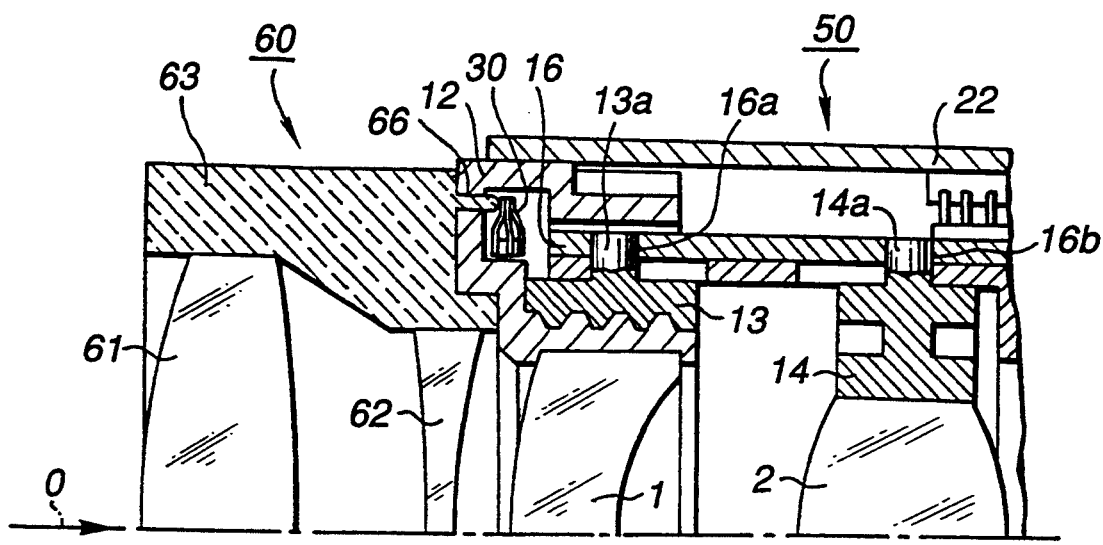
FIG. 15 is a cross sectional view which illustrates a state where a tele-conversion lens is mounted on the lens barrel of the camera according to the second embodiment.
Figure 16:
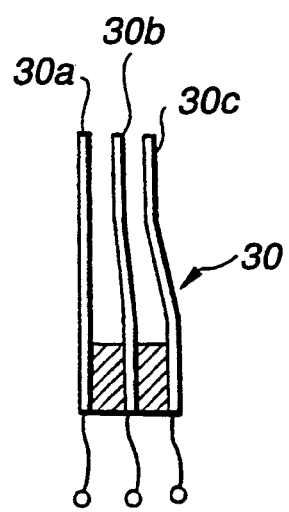
FIG. 16 is an enlarged side elevational view which illustrates an identification switch of the camera according to the second embodiment.

FIG. 13 illustrates the leading portion of the lens barrel in a standard state in which no conversion lens is mounted, FIG. 14 illustrates the same when the wide conversion lens is mounted, and FIG. 15 illustrates the same when the tele-conversion lens is mounted. As shown in FIG. 13, a through hole 12d is formed at the leading surface of the first lens barrel 12, while an identifying switch 30 composed of three leaf contacts 30a to 30c is disposed in the lens barrel 12 corresponding to the through hole 12d as shown in FIG. 16. The leaf contacts 30a to 30c of the switch 30 are separated from one another in the standard state.

On the other hand, each conversion lens has projections 76 and 66 each having a predetermined length corresponding to the types of the conversion lenses as shown in FIGS. 14 and 15. When the wide conversion lens is mounted on the camera, the leaf contacts 30a and 30b are conducted to each other. When the tele-conversion lens is mounted on the camera, the leaf contacts 30a, 30b and 30c are conducted to one another.

Figure 17:
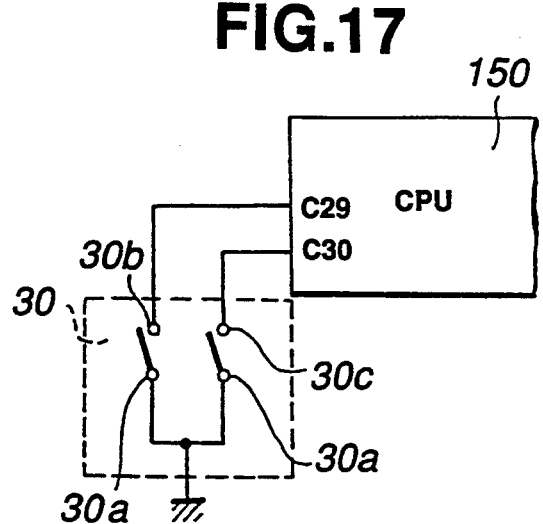
FIG. 17 is a block diagram which illustrates only an essential portion of the structure of an electric circuit for use in the camera according to the second embodiment.

FIG. 17 illustrates an electric circuit according to the second embodiment having an arrangement that the identification switch 30 is composed of a common contact 30a and contacts 30b and 30c. The contacts 30b and 30c are respectively connected to input terminals C29 and C30 of the CPU 150. As a result of the foregoing arrangement, the camera is able to discriminate whether or not a conversion lens is mounted and the type of conversion lens. Hence, an operation similar to the first embodiment is performed.

According to the second embodiment, the necessity of providing the movable contact and the resistance for each conversion lens can be eliminated. Therefore, the size and the cost of the conversion lens can be further reduced as compared with the first embodiment. Although the second embodiment has the arrangement that the two types of the conversion lenses are provided, a further large number of conversion lenses can, of course, be used by increasing the number of the leaf contacts.

Figure 18:
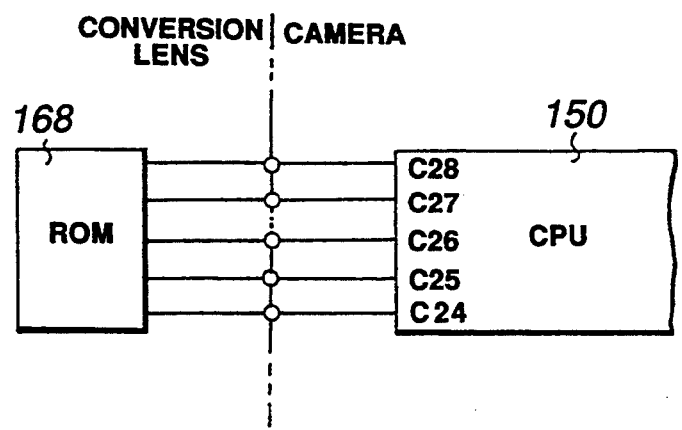
FIG. 18 is a structural view which illustrates an essential portion of an electric circuit for use in a camera of a camera system according to a third embodiment of the present invention.

FIG. 18 is a block diagram which illustrates an essential portion of the structure of an electric circuit of a camera according to a third embodiment of the present invention. The third embodiment has an arrangement that the means for discriminating whether or not the conversion lens is mounted and the type of the conversion lens comprises a ROM 168 provided for each conversion lens and which indicates the type of the conversion lens. When the conversion lens is mounted on the camera, the ROM 168 is connected to any one of input terminals C24 to C28 of the CPU 150 to establish a communication with the CPU 150 in the camera. As a result, a discrimination operation similar to the aforesaid embodiments is performed. The residual arrangements are the same as those of each of the aforesaid embodiments, and their descriptions are omitted here.

According to the third embodiment, the types of the conversion lenses can be significantly increased by only changing the contents of the ROM. If the transmittance of each lens, AE information such as FNo, and correction coefficient for AF and the like are stored in the memory in the ROM 168 in addition to the type of the conversion lens, a further precise automatic control using information peculiar to each conversion lens can be performed.

Figure 19:
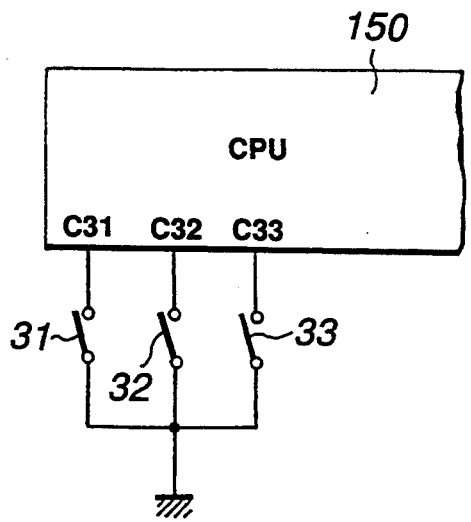
FIG. 19 is a structural view which illustrates an essential portion of an electric circuit for use in a camera of a camera system according to a fourth embodiment of the present invention.

FIG. 19 is a block diagram which illustrates an essential portion of the structure of an electric circuit for use in a camera according to a fourth embodiment of the present invention. The fourth embodiment has an arrangement that the means for discriminating whether or not a conversion lens is mounted and the type of the mounted conversion lens comprises manual input switches 31, 32 and 33 provided for the camera. In accordance with the state of the switches 31, 32 and 33, an operation similar to the first embodiment can be performed.

That is, reference numeral 31 represents a tele-conversion lens mounting switch, 32 represents a wide conversion lens mounting switch, 33 represents a macro-conversion lens mounting switch. When all of the switches 31, 32 and 33 are switched off, the subject state is the standard state in which no conversion lens is mounted on the camera.

Each of the switches 31, 32 and 33 has an end portion which is a common contact and another end portion which is connected to any one of corresponding input terminals C31 to C33 of the CPU 150. As a result of the structure thus arranged, the camera is able to discriminate whether or not a conversion lens is mounted and the type of the mounted conversion lens by manually switching each switch. Therefore, an operation similar to that according to the first embodiment can be performed.

According to the fourth embodiment, a necessity of providing a special means such as an electric or mechanical connection member for the connection mount portion of the conversion lens and that of the camera can be eliminated. Therefore, a smaller and lower cost conversion lens and camera as compared with each of the foregoing embodiments can be provided.

Although each of the first to the fourth embodiments is provided with the means for discriminating whether or not a conversion lens is mounted and the type of the mounted conversion lens, it is sufficient to provide a means for only discriminating whether or not a conversion lens is mounted if only one conversion lens can be mounted on the subject camera. Although the description is made about a case where the present invention is adapted to a single lens reflex camera, the present invention is not limited to this. The present invention may, of course, be widely adapted to all of various cameras.

The description of each of the foregoing embodiments is limited to the arrangement that the zoom lens of the camera is brought to the telescopic end when the tele-conversion lens is mounted and the same is brought to the wide angle end when the wide conversion lens is mounted. However, the present invention is not limited to this. The zoom lens may be brought to a region having a predetermined range, for example, it may be brought to a position adjacent to the telescopic end or a position of the focal point distance adjacent to the wide angle end or the like depending upon the use of each conversion lens of the camera.

When the positions of the focusing lens 1, the variator lens 2 and the release lens 3 respectively are 1a, 2a and 3a in a case where the aforesaid lenses 1, 2 and 3 have been zoomed from wide angle end W to telescopic end T as shown in FIG. 20, extension quantity range L2 in the zooming ranges W to T in the standard state is expressed with coarse diagonal lines drawn toward lower right positions. On the other hand, extension quantity range L3 in the zooming range W to W' in the state where the wide conversion lens is mounted and extension quantity range in the zooming range T to T' in the state where the tele-conversion lens is mounted are respectively expressed with dense diagonal lines drawn toward upper right positions.

When the positions of the foregoing lenses 1, 2 and 3 respectively are 1b, 2b and 3b in a case where the aforesaid lenses 1, 2 and 3 have been zoomed from the wide angle end W to the telescopic end T as shown in FIG. 21, extension quantity range L2 in the zooming ranges W to T in the standard state and the state where the macro-conversion lens is mounted is expressed with coarse diagonal lines drawn toward lower right positions. On the other hand, extension quantity range L4 in the case where the macro-conversion lens is mounted is expressed with dense dots.

Although the invention has been described in its preferred form with a certain degree of particularly, it is understood that the present disclosure of the preferred form may been changed in the details of construction and the combination and arrangement of parts may be resorted to without departing from the spirit and the scope of the invention as hereinafter claimed.

What is claimed is:

1. A camera system incorporating a camera having a photographing lens and a conversion lens detachable with respect to said camera and acting to change a focal point distance of said photographing lens, said camera system comprising:

electric drive means for driving said photographing lens;

setting means for operating said electric drive means to set a focus position to a desired value;

mounting signal generating means for automatically or manually transmitting a signal denoting that said conversion lens has been mounted on said photographing lens; and control means for operating said electric drive means in accordance with an output from said setting means and for forcibly operating said electric drive means until said focus position is made to lie in a range of a proper distance if said set focus position is not a proper distance for performing a photographing operation by using said conversion lens when said control means receives an output from said mounting signal generating means.

2. A camera system according to claim 1, wherein said setting means includes a focusing sensor for autofocusing.

3. A camera system according to claim 1, wherein said setting means includes a manual operation member for adjusting distance.

4. A camera system according to claim 1, wherein said mounting signal generating means includes a resistor provided in said conversion lens.

5. A camera system according to claim 1, wherein said mounting signal generating means includes a nonvolatile memory provided in said conversion lens.

6. A camera system according to claim 1, wherein said mounting signal generating means includes a manual operation member provided in a camera body.

7. A camera system according to claim 6 wherein said manual operating member is selectively switchable to one of a plurality of positions, each position representing a type of conversion lens and at least one additional position representing that no conversion lens is mounted upon said camera.

8. A camera system according to claim 1 wherein said conversion lens is provided with a projecting member having a length identifying a type of conversion lens, wherein each different type of conversion lens is provided with a projection of a different given length;
  said mounting signal generating means including means engaged by a projection means when a conversion lens is mounted upon said camera to identify the type of conversion lens.

9. A camera system according to claim 8 wherein said mounting signal generating means includes means for generating a given signal when no conversion lens is mounted upon said camera.

10. A camera system according to claim 1 wherein said photographing lens has mounting means on a front end thereof facing an object to be photographed for removably mounting said conversion lens.

11. A camera system incorporating a camera and a plurality of types of conversion lenses selectively mounted with respect to said camera and acting to change a focal point distance of a photographing lens, said camera system comprising:
  electric drive means for driving said photographing lens;
  setting means for operating said electric drive means to set a focus position to a desired value;
  signal transmission terminals disposed in connection portions between said conversion lenses and said photographing lens;
  lens-type signal generating means for generating a signal denoting a type of a mounted conversion lens responsive to the conversion lens mounted on said photographing lens; and
  control means for operating said electric drive means in accordance with an output from said setting means and for forcibly operating said electric drive means until said focus position is made to lie in a range of a proper distance if said set focus position is not a proper distance for performing a photographing operation by using said conversion lens when said control means receives an output from said lens-type signal generating means.

12. A camera system according to claim 11, wherein said lens-type signal generating means comprises a resistor which is connected to said signal transmission terminal of said conversion lens, and a value of which is different depending upon a type of said conversion lens.

13. A camera system according to claim 11, wherein said lens-type signal generating means comprises a ROM connected to said signal transmission terminal of said conversion lens and includes data which is different depending upon a type of said conversion lens.

14. A camera system incorporating a camera and a tele-conversion lens detachable with respect to said camera and acting to lengthen a focal point distance of a photographing lens, said camera system comprising:
  electric drive means for driving said photographing lens;
  drive quantity detection means for detecting a drive quantity of said photographing lens;
  setting means for operating said electric drive means to set a focus position to a desired value;
  signal generating means for transmitting a predetermined signal when said tele-conversion lens has been mounted on said photographing lens; and
  control means for operating said electric drive means in accordance with an output from said setting means and for setting a shortest photographing distance, which can be photographed, to a position toward a longer distance direction than a position, which is employed when said tele-conversion lens is not mounted, when said control means receives an output from said signal generating means.

15. A conversion lens mounted on a photographing lens of a camera and arranged to change the focal point distance of said photographing lens,
  said camera incorporating setting means for setting a focus position in accordance with a distance of an object, and drive control means for limiting a range of said focus position to a predetermined distance in accordance with a type of said conversion lens when said conversion lens has been mounted, said conversion lens comprising:
  identification signal generating means for including a type of conversion lens.

16. A camera having a zoom lens, comprising:
  focal point distance detection means for detecting a focal point distance of said zoom lens;
  a conversion lens;
  discrimination means for discriminating a type of said conversion lens when mounted on said zoom lens;
  focal point adjustment means for adjusting a focal point of said zoom lens; and
  control means for enabling a focal point adjustment to be performed in an extended focal point adjustment range which is wider that a standard focal point adjustment range, which is employed when no conversion lens is mounted, in accordance with an output from said discrimination means and an output from said focal point distance detection means when said conversion lens has been mounted on said zoom lens and a release operation of said camera has been performed.

17. A camera according to claim 16, wherein said conversion lens is a macro-conversion lens for mounting on said camera.

18. A system incorporating a zoom lens, a camera body, and a conversion lens to be mounted on said zoom lens, said system comprising:
  a conversion lens having output means for outputting information indicating a type of said conversion lens;
  a zoom lens;
  a focal point distance detection means for detecting a focal point distance of said zoom lens;
  discrimination means for discriminating a type of said conversion lens which can be mounted on said zoom lens;
  focal point adjustment means for adjusting a focal point of said zoom lens; and
  control means for enabling a focal point adjustment to be performed in an extended focal point adjustment range which is wider than a standard focal point adjustment range, which is employed when no conversion lens is mounted, in accordance with an output from said discrimination means and an output from said focal point distance detection means when said conversion lens has been mounted on said zoom lens and a release operation of said camera has been performed.

19. A system according to claim 18, wherein a macro-conversion lens can be mounted on said camera.

20. A camera system incorporating a camera having a zoom lens and a conversion lens detachable with respect to said zoom lens and acting to change a focal point distance of said zoom lens, said camera system comprising:
  electric drive means for performing a zooming operation;

setting means for operating said electric drive means to set a focus distance value to a desired value;

mounting signal generating means for automatically or manually transmitting a signal denoting that said conversion lens has been mounted on said photographing lens; and control means for operating said electric drive means in accordance with an output from said setting means and for forcibly operating said electric drive means until said focal point distance value is made to be a proper distance if said set focal point distance value is not a proper distance for performing a photographing operation employing said conversion lens when said control means receives an output from said mounting signal generating means.

21. A camera system incorporating a photographing lens, a focal point distance of which can be varied, and a conversion lens detachable with respect to said photographing lens and arranged to change a focal point distance of said photographing lens, said camera system comprising:

electric drive means for causing an operation of changing a focal point distance to be performed;

setting means for operating said electric drive means to set a focal point distance to a desired position;

mounting signal generating means for automatically or manually transmitting a signal denoting that said conversion lens has been mounted on said photographing lens; and control means for operating said electric drive means in accordance with an output from said setting means and for forcibly causing said electric drive means to adjust said focal point distance to be a proper distance if said set focal point distance is not a proper position for performing a photographing operation employing said conversion lens when said control means receives an output from said mounting signal generating means.

22. A camera system incorporating a photographing lens, a focal point distance of which can be varied, and a tele-conversion lens detachable with respect to said photographing lens and arranged to change a focal point distance of said photographing lens to a long focal point side, said camera system comprising:

electric drive means for changing said focal distance;

setting means for operating said electric drive means to set a desired focal point distance;

mounting signal generating means for automatically or manually transmitting a signal denoting that said tele-conversion lens has been mounted on said photographing lens; and control means for operating said electric drive means in accordance with an output from said setting means and for forcibly shifting said focal point distance to a longest focal point distance of said photographing lens or adjacent to said longest focal point distance when said control means receives an output from said mounting signal generating means.

23. A camera system incorporating a photographing lens, a focal point distance of which can be varied, and a wide-conversion lens detachable with respect to said photographing lens and arranged to change a focal point distance of said photographing lens to a short focal point side, said camera system comprising:

electric drive means for changing said focal distance;

setting means for operating said electric drive means to set a desired focal point distance;

mounting signal generating means for automatically or manually transmitting a signal denoting that said wide conversion lens has been mounted on said photographing lens; and control means for operating said electric drive means in accordance with an output from said setting means and for forcibly shifting said focal point distance to a shortest focal point distance of said photographing lens or adjacent to said shortest focal point distance when said control means receives an output from said mounting signal generating means.

24. A camera incorporating a zoom lens, comprising:

focal point distance detection means for detecting a focal point distance of said zoom lens;

drive means for changing a focal point distance of said zoom lens;

a conversion lens;

discrimination means for discriminating a type of said conversion lens when mounted on said zoom lens; and control means for discriminating whether or not said focal point distance of said zoom lens is in a proper state in accordance with an output from said discrimination means and an output from said focal point distance detection means when said conversion lens has been mounted on said zoom lens, and changing said focal point distance of said zoom lens to a proper focal point distance state when said focal point distance state is not in a proper state.

25. A camera according to claim 24, wherein said camera sets a focal point distance of said zoom lens to a wide-angle range focal distance when a wide conversion lens is mounted on said camera.

26. A camera according to claim 24, wherein said camera sets a focal point distance of said zoom lens to a telescopic range focal distance when a tele-conversion lens is mounted on said camera.

27. A camera incorporating a zoom lens, comprising:

focal point distance detection means for detecting a focal point distance of said zoom lens;

drive means for changing a focal point distance of said zoom lens;

a conversion lens;

discrimination means for discriminating a type of said conversion lens when mounted on said zoom lens;

focal point adjustment means for adjusting a focal point of said zoom lens; and control means for discriminating whether or not said focal point distance of said zoom lens is in a proper state in accordance with an output from said discrimination means and an output from said focal point distance detection means when a conversion lens has been mounted on said zoom lens, and changing said focal point distance of said zoom lens to a proper focal point distance state when said focal point distance state is not in a proper state, and then adjusting said focal point of said zoom lens by said focal point adjustment means responsive to a release operation of said camera.

28. A camera according to claim 27, wherein said camera sets said focal point distance of said zoom lens to a wide-angle range focal distance when a wide conversion lens is mounted on said camera to adjust a focal point in a wider focal adjustment range than a focal point adjustment range to be employed when said conversion lens is not mounted.

29. A camera according to claim 27, wherein said camera sets said focal point distance of said zoom lens to a telescopic range focal distance when a tele-conversion lens is mounted on said camera to adjust a focal point in a narrower focal adjustment range than a focal point adjustment range to be employed when said conversion lens is not mounted.

30. A system incorporating a zoom lens, a camera body, and a conversion lens to be mounted on said zoom lens, said system comprising:
   a conversion lens having output means for outputting information indicating a type of said conversion lens;
   a zoom lens;
   a focal point distance detection means for detecting a focal point distance of said zoom lens;
   drive means for changing said focal point distance of said zoom lens;
   discrimination means for discriminating a type of said conversion lens in accordance with an output from said output means of said conversion lens when said conversion lens is mounted on said zoom lens; and
   control means for discriminating whether or not said focal point distance of said zoom lens is in a proper state in accordance with an output from said discrimination means and an output from said focal point distance detection means when said conversion lens has been mounted on said zoom lens, and causing said drive means to change said focal point distance of said zoom lens to a proper focal point distance state when said focal point distance state is not in a proper state.

31. A system according to claim 30, wherein said system sets said focal distance of said zoom lens of said camera to a wide-angle range focal point distance when a wide conversion lens is mounted.

32. A system according to claim 30, wherein said system sets said focal distance of said zoom lens of said camera to a telescopic range focal point distance when a tele-conversion lens has been mounted.

33. A system incorporating a zoom lens, a camera body, and a conversion lens to be mounted on said zoom lens, said system comprising:
   said conversion lens having output means for outputting information indicating a type of said conversion lens;
   a focal point distance detection means for detecting a focal point distance of said zoom lens;
   drive means for changing said focal point distance of said zoom lens;
   discrimination means for discriminating a type of said conversion lens in accordance with an output from said output means of the conversion lens mounted on said zoom lens;
   focal point adjustment means for adjusting said focal point of said zoom lens; and
   control means for discriminating whether or not said focal point distance of said zoom lens is in a proper state in accordance with an output from said discrimination means and an output from said focal point distance detection means when said conversion lens has been mounted on said zoom lens, and causing said drive means to change said focal point distance of said zoom lens to a proper focal point distance state when said focal point distance state is not in a proper state, and causing said focal point adjustment means to adjust said focal point of said zoom lens responsive to a releasing operation of said camera.

34. A system according to claim 33, wherein said camera sets a focal point distance of said zoom lens to a wide-angle range focal point distance when a wide conversion lens is mounted on said camera to adjust said focal point in a wider focal point adjustment range than a focal point adjustment range to be employed when a conversion lens is not mounted.

35. A system according to claim 33, wherein said camera sets a focal point distance of said zoom lens to a telescopic range focal point distance when a tele-conversion lens has been mounted on said camera to adjust said focal point in a narrower focal point adjustment range than a focal point adjustment range to be employed when no conversion lens is mounted.

36. A method for operating a camera system comprised of a zoom lens for detachably receiving any one of a plurality of different conversion lenses thereon, said method comprising the steps of:
   (a) detecting the presence or absence of a conversion lens on said camera;
   (b) determining the type of conversion lens mounted;
   (c) determining the focal point of the zoom lens;
   (d) moving the zoom lens to a given position when the zoom lens is not located at said given position and the conversion lens mounted is detected as a predetermined type of conversion lens which requires the zoom lens to be moved to said given position;
   (e) determining whether the zoom lens lies within a predetermined range for use with said predetermined type of conversion lens;
   (f) determining whether a focusing lens forming part of said zoom lens lies within a predetermined range incorporating permissible focal points when a predetermined type of conversion lens is mounted; and
   (g) moving the focusing lens to the allowable nearest end when a focal point of the focusing lens is not included in said given range.

37. The method of claim 35 further comprising the steps of:
   (h) measuring a distance to an object to be photographed when a camera release switch is operated;
   (i) determining whether the focusing lens lies within said given range of step (f) when a predetermined type of conversion lens is installed; and
   (j) performing a photographing operation when the distance determined in step (h) lies within said given range.

38. The method of claim 37 further comprising the step of:
   (k) extending the focusing lens to the allowable nearest end when a tele-conversion lens is mounted on said camera and the object distance lies outside of said given extension quantity range and returning to step (a) of said method.

39. The method of claim 36 wherein when a tele-conversion lens is mounted on the zoom lens, step (d) further comprises moving the zoom lens to a telescopic position when the zoom lens is not at a telescopic position; step (e) further comprises determining whether the zoom lens lies within a predetermined range for use with a tele-conversion lens; and step (f) further comprises determining whether the focusing lens lies within a predetermined range incorporating permissible focal points when a tele-conversion lens is mounted.

40. The method of claim 36 wherein when a wide conversion lens is mounted on the zoom lens, step (d) further comprises moving the zoom lens to a wide position when the zoom lens is not at a wide position; step (e) further comprises determining whether the zoom lens lies within a predetermined range for use with a wide conversion lens; and step (f) further comprises determining whether the focusing lens lies within a predetermined range incorporating permissible focal points when a wide conversion lens is mounted.

41. The method of claim 36 wherein when a macro-conversion lens is mounted on the zoom lens, step (d) further comprises moving the zoom lens to a given position for use with a macro-conversion lens when the zoom lens is not at such a position; step (e) further comprises determining whether the zoom lens lies within a predetermined range for use with a macro-conversion lens; and step (f) further comprises determining whether the focusing lens lies within a predetermined range incorporating permissible focal points when a macro-conversion lens is mounted.

42. A method for operating a camera system comprised of a zoom lens for detachably receiving any one of a plurality of different conversion lenses thereon, said method comprising the steps of:
 (a) determining whether or not the zoom lens is within a standard focal range for operation in the absence of a conversion lens;
 (b) contracting the zoom lens to an allowable near end when it is not in said standard focal range;
 (c) determining a distance to an object to be photographed when a camera release member is operated;
 (d) determining whether an extension quantity of the focusing lens is included in a permissible extension quantity range;
 (e) moving the focusing lens to an allowable near end when the focusing lens is not in the range set forth in step (d); and
 (f) returning to step (a).

43. A method for operating a camera system comprised of a zoom lens for detachably receiving any one of a plurality of different conversion lenses thereon, said method comprising the steps of:
 (a) determining whether or not the zoom lens is within a standard focal range for operation in the absence of a conversion lens;
 (b) contracting the zoom lens to an allowable near end when it is not in said standard focal range;
 (c) determining the distance to an object to be photographed when a camera release member is operated;
 (d) determining whether an extension quantity of the focusing lens is included in a permissible extension quantity range;
 (e) performing a photographing operation when the focusing lens is within the range set forth in step (d).

* * * * *